United States Patent
Serizawa et al.

(10) Patent No.: US 11,572,999 B2
(45) Date of Patent: Feb. 7, 2023

(54) RESIN MOLDED PRODUCT AND VEHICLE PART

(71) Applicant: Koito Manufacturing Co., Ltd., Tokyo (JP)

(72) Inventors: Susumu Serizawa, Shizuoka (JP); Yasuhiro Kameoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 201 days.

(21) Appl. No.: 16/215,788

(22) Filed: Dec. 11, 2018

(65) Prior Publication Data
US 2019/0186707 A1 Jun. 20, 2019

(30) Foreign Application Priority Data
Dec. 15, 2017 (JP) .............................. JP2017-240570

(51) Int. Cl.
| | |
|---|---|
| *F21S 41/50* | (2018.01) |
| *B32B 27/08* | (2006.01) |
| *F21S 41/24* | (2018.01) |
| *F21S 41/37* | (2018.01) |
| *B32B 27/36* | (2006.01) |

(52) U.S. Cl.
CPC .............. *F21S 41/50* (2018.01); *B32B 27/08* (2013.01); *B32B 27/365* (2013.01); *F21S 41/24* (2018.01); *F21S 41/37* (2018.01); *B32B 2255/10* (2013.01); *B32B 2255/205* (2013.01); *B32B 2307/412* (2013.01); *B32B 2605/00* (2013.01)

(58) Field of Classification Search
CPC . F21S 41/50; F21S 41/24; F21S 41/37; B32B 27/08; B32B 27/365; B32B 2255/10; B32B 2255/205; B32B 2307/412; B32B 2605/00
USPC ....................................................... 428/411.1
See application file for complete search history.

(56) References Cited

U.S. PATENT DOCUMENTS

| | | | |
|---|---|---|---|
| 6,287,672 B1 * | 9/2001 | Fields ..................... | B32B 15/08 |
| | | | 428/209 |
| 6,878,649 B2 * | 4/2005 | Harata .................... | B32B 15/14 |
| | | | 156/166 |

(Continued)

FOREIGN PATENT DOCUMENTS

| | | | | |
|---|---|---|---|---|
| JP | 2007250290 A | * | 9/2007 | ........... B60Q 1/2665 |
| JP | 2010192217 A | * | 9/2010 | |

(Continued)

OTHER PUBLICATIONS

Machine translation of JP 2010-192217 A (Year: 2010).*

(Continued)

*Primary Examiner* — Callie E Shosho
*Assistant Examiner* — Steven A Rice
(74) *Attorney, Agent, or Firm* — Venjuris, P.C.

(57) ABSTRACT

A resin molded product includes: a laminated body including a transparent resin layer that constitutes a transparent resin substrate molded in a predetermined shape, and a metal evaporation film formed on a surface of the transparent resin layer; and a colored layer formed on one surface of the laminated body and configured to transmit infrared rays. The laminated body includes a region where the metal evaporation film is removed by an irradiation with an infrared laser beam.

6 Claims, 9 Drawing Sheets

(56) References Cited

U.S. PATENT DOCUMENTS

| | | | | |
|---|---|---|---|---|
| 2003/0027917 | A1* | 2/2003 | Namiki | C08K 9/04 524/492 |
| 2003/0178739 | A1* | 9/2003 | Tziovaras | B29C 45/14811 264/132 |
| 2004/0216406 | A1* | 11/2004 | Egashira | B32B 33/00 52/311.1 |
| 2010/0309677 | A1* | 12/2010 | Kazaoka | F21S 43/249 362/519 |
| 2011/0310610 | A1* | 12/2011 | Brown | B60Q 1/56 362/253 |
| 2013/0010486 | A1* | 1/2013 | Natsume | F21S 43/249 362/511 |
| 2013/0010488 | A1* | 1/2013 | Koizumi | F21S 41/321 362/517 |
| 2014/0063830 | A1* | 3/2014 | Kim | F21S 43/26 362/509 |
| 2016/0075823 | A1* | 3/2016 | Imazato | C08G 64/0208 528/370 |

FOREIGN PATENT DOCUMENTS

| | | | | |
|---|---|---|---|---|
| JP | 2013159000 | A | * | 8/2013 |
| JP | 2015011941 | A | * | 1/2015 |
| JP | 2015-103292 | A | | 6/2015 |

OTHER PUBLICATIONS

Hardy, Norm, "What is Thin Film Deposition By Thermal Evaporation?", Sep. 30, 2013 (Year: 2013).*
Machine translation of JP 2013-159000 A (Year: 2013).*
Machine translation of JP 2015-011941 A (Year: 2015).*
Machine translation of JP 2007-250290 A (Year: 2007).*

* cited by examiner

WHEN TURNED OFF

WHEN TURNED ON

RESIN MOLDED PRODUCT AND VEHICLE PART

CROSS-REFERENCE TO RELATED APPLICATIONS

This application is based on and claims priority from Japanese Patent Application No. 2017-240570, filed on Dec. 15, 2017 with the Japan Patent Office, the disclosure of which is incorporated herein in its entirety by reference.

TECHNICAL FIELD

The present disclosure relates to a resin molded product and a vehicle part using the resin molded product.

BACKGROUND

In the related art, a vehicle part having a pattern formed by laser decoration is known (Japanese Patent Laid-Open Publication No. 2015-103292), in which a metal evaporation film is formed on one surface of a resin molded product made of a plate-like transparent resin substrate, and then, a part of the evaporation film is cut away by irradiating the metal evaporation film with a laser beam.

In the vehicle part disclosed in Japanese Patent Laid-Open Publication No. 2015-103292, a portion where the metal evaporation film is formed is observed as a metal-tone evaporation surface, and a portion where the metal evaporation film is not formed is observed as colorless and transparent.

SUMMARY

However, with the above configuration, since the colorless and transparent pattern portion also partially reflects light, the contrast between the pattern portion and the evaporation portion is weak. Therefore, there is room for improvement in aesthetic appearance.

The present disclosure has been made in view of these circumstances. The present disclosure is to provide a resin molded product and a vehicle part in which aesthetic appearance of a pattern is enhanced due to contrast between a color-tone of a metal-tone and a color-tone of a colored layer.

In order to achieve the above object, a resin molded product according to an aspect of the present disclosure includes: a laminated body including a transparent resin layer that constitutes a transparent resin substrate molded in a predetermined shape, and a metal evaporation film formed on a surface of the transparent resin layer; and a colored layer formed on one surface of the laminated body and configured to transmit infrared rays. The laminated body includes a region where the metal evaporation film is removed by an irradiation with an infrared laser beam.

According to the above aspect, when observed from the metal evaporation film side, the metal evaporation film has a metal-tone appearance, and the area where the metal evaporation film is not formed shows a color-tone of a paint contained in the colored layer. For this reason, the aesthetic appearance of the pattern is enhanced due to contrast between the color-tone of the metal-tone and the color-tone of the colored layer.

Further, when the metal evaporation film is removed by a laser beam, the colored layer absorbs the laser beam, so that the temperature of the colored layer rises. Therefore, deformation may occur. That is, the colored layer may be removed, the colored layer may be discolored, or the transparent resin substrate may be deformed. According to the above aspect, since the colored layer transmits the infrared laser beam, the temperature rise of the colored layer is suppressed, and thus, such deformation is suppressed.

In the above aspect, the colored layer may contain a black pigment.

Further, in the above aspect, the colored layer may be formed on a side of the metal evaporation film of the laminated body.

Further, the colored layer may be formed on a side of the transparent resin layer of the laminated body.

A vehicle part according to another aspect of the present disclosure includes the resin molded product according to the above aspect.

According to the present disclosure, a resin molded product and a vehicle part in which aesthetic appearance of a pattern is enhanced due to contrast between a color-tone of a metal-tone and a color-tone of a colored layer may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5A is a cross-sectional view taken along line VA-VA in FIG. 4, and FIG. 5B is a cross-sectional view taken along line VB-VB in FIG. 4.

FIG. 6A is a view for explaining an action at the time of turning OFF the vehicle lamp and FIG. 6B is a view for explaining an action at the time of turning ON the vehicle lamp.

FIG. 7A is a view illustrating the appearance of the inner lens at the time of turning OFF the vehicle lamp and FIG. 7B is a view illustrating the appearance of the inner lens at the time of turning ON the vehicle lamp.

FIG. 8A is a view for explaining an action at the time of turning OFF the vehicle lamp and FIG. 8B is a view for explaining an action at the time of turning ON the vehicle lamp.

FIG. 9A is a view illustrating the appearance of the inner lens at the time of turning OFF the vehicle lamp, and FIG. 9B is a view illustrating the appearance of the inner lens at the time of turning ON the vehicle lamp.

DETAILED DESCRIPTION

Figure 1:
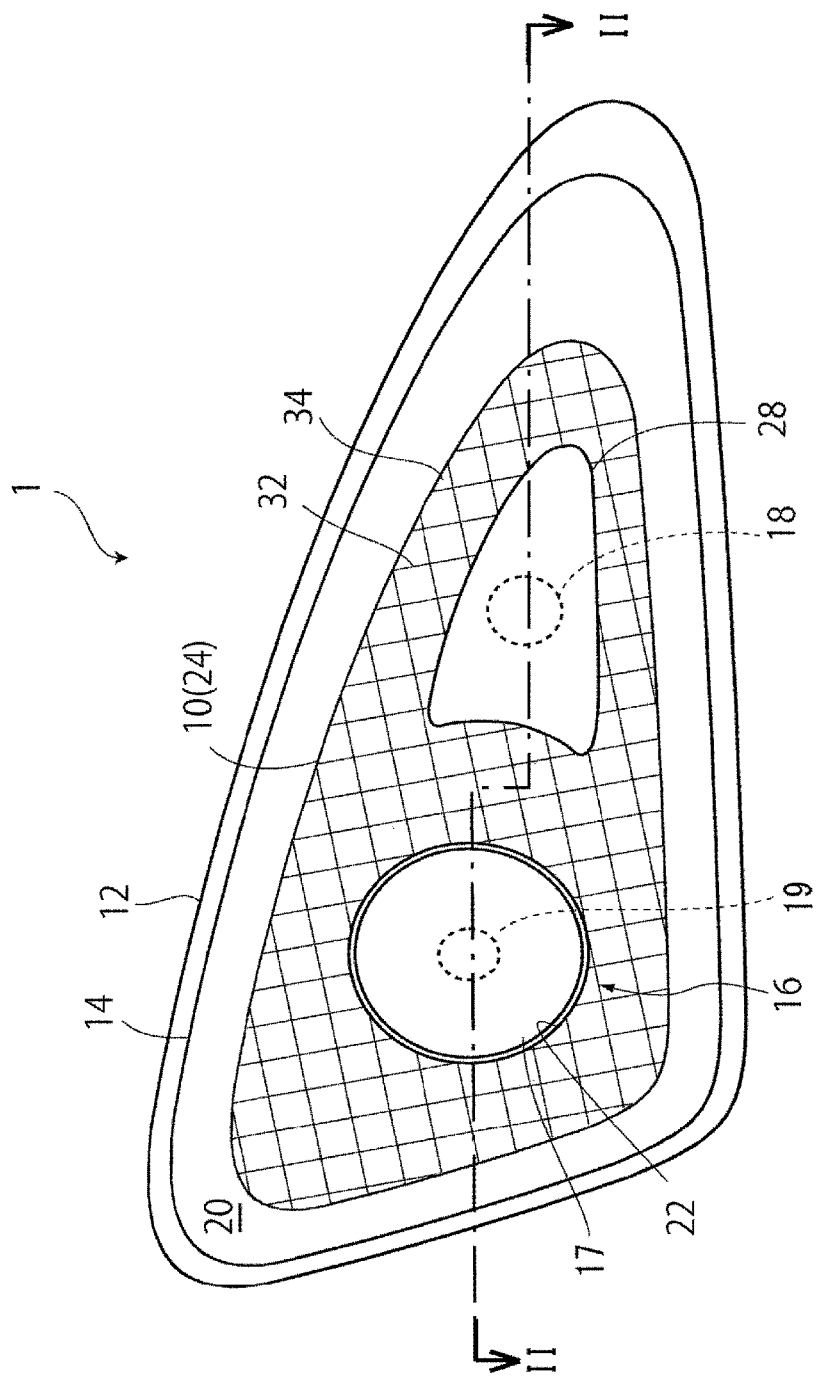
FIG. 1 is a front view of a vehicle lamp according to an embodiment of the present disclosure.
Figure 2:
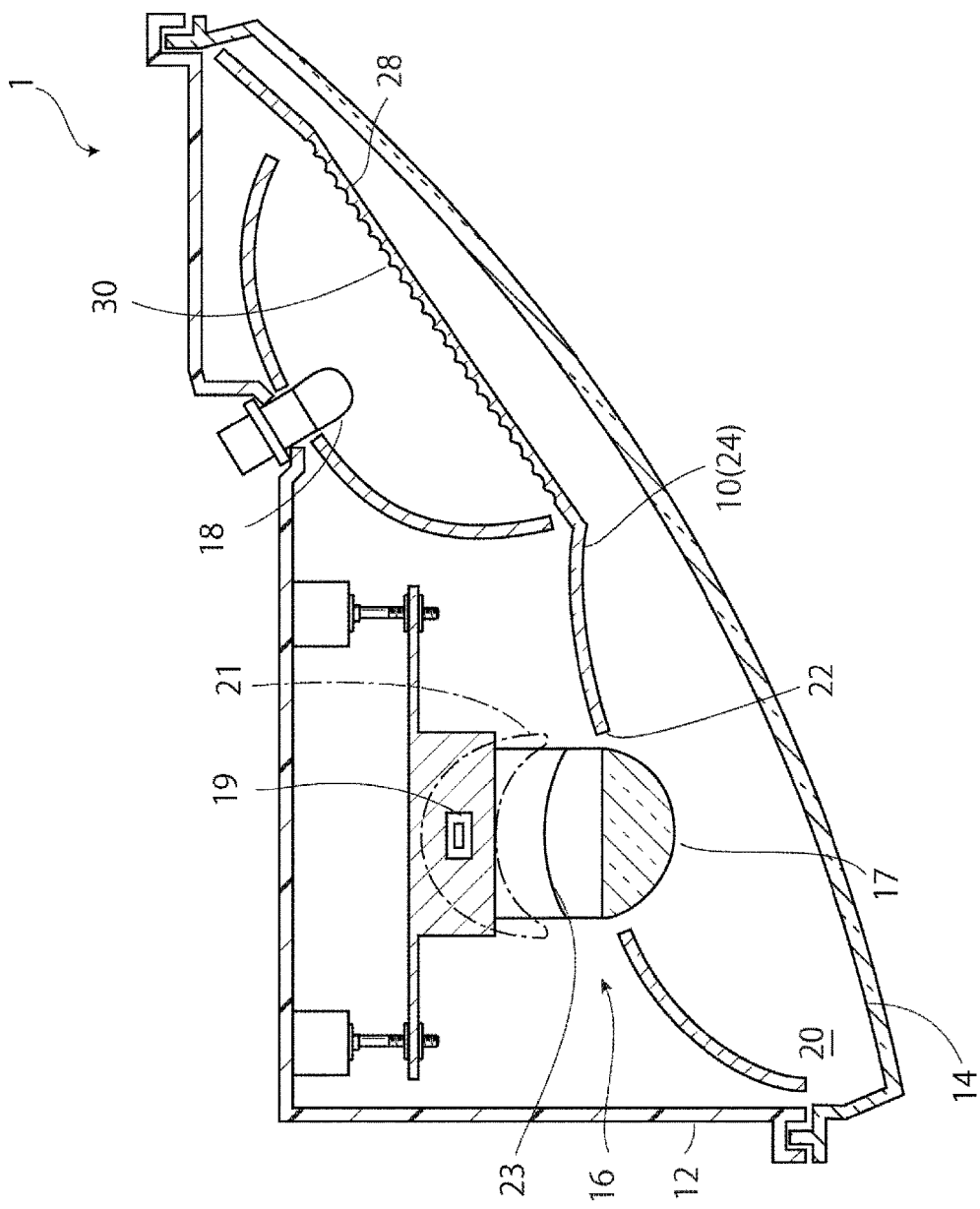
FIG. 2 is a cross-sectional view of the vehicle lamp according to the embodiment taken along line II-II in FIG. 1.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a resin molded product and a vehicle lamp according to the present disclosure will be described with reference to the drawings on the basis of embodiments. In the below, terms relating to directions, for example, "front side," "rear side," "front surface," and "back surface" indicate directions with respect to a vehicle lamp in a posture in which the vehicle lamp is mounted on a vehicle unless otherwise specified. Further, in the following embodiments, the same components are denoted by the same reference numerals, and duplicate descriptions are omitted.

First Embodiment

In a first embodiment, a resin molded product according to the present disclosure is embodied as an extension 10 used as a component of a vehicle lamp 1. The vehicle lamp 1 illustrated in FIG. 1 is a right-side headlight arranged on the right side as viewed from the front of a vehicle.

The vehicle lamp 1 includes a lamp body 12, an outer cover 14, a lamp unit 16, a clearance lamp light source 18, and the extension 10.

The lamp body 12 has a container shape which is opened to the front surface. The outer cover 14 covers the opening on the front surface of the lamp body 12, and a lamp chamber 20 is defined by the lamp body 12 and the outer cover 14.

The lamp unit 16 is a headlamp lamp unit mainly including a projection lens 17, a light source 19, a reflector 21, and a shade 23. The light source 19 is, for example, a light emitting diode (LED) light source. The lamp unit 16 is configured to switch emitted light from the light source 19 between a high beam and a low beam.

The clearance lamp light source 18 is, for example, a halogen bulb, and is arranged on a side of the lamp unit 16.

The extension 10 is a transparent resin substrate 24 which is a resin molded product obtained by molding a transparent resin such as a polycarbonate resin, or an acrylic resin such as a polymethyl methacrylate resin in a predetermined shape.

The extension unit 10 is arranged between the lamp unit 16 and the outer cover 14. Further, a front shape of the extension 10 is configured to correspond to a front shape of the vehicle lamp 1.

A circular opening 22 is provided on one side (left side in FIG. 1) with respect to a center of the extension 10. The lamp unit 16 is arranged on a rear side of the opening 22 of the extension 10, and the projection lens 17 of the lamp unit 16 is configured to be protruded from the opening 22. Therefore, when turning ON the light source 19, irradiation light passes through the opening 22 and is emitted to the front side.

A clearance lamp light transmission region 28 is provided on an opposite side (right side in FIG. 1) of the opening 22 with respect to the center of the extension 10. The clearance lamp light transmission region 28 has a substantially rounded triangular shape in which a vertical length is shortened from one side (left side in FIG. 1) to the other side (right side in FIG. 1) in lateral direction of the extension 10.

The clearance lamp light source 18 is arranged on the rear side of the clearance lamp light transmission region 28 of the extension 10.

A plurality of steps 30 are formed on the back surface of the clearance lamp light transmission region 28 of the extension 10. When turning ON the clearance lamp light source 18, the emitted light from the clearance lamp light source 18 passes through the clearance lamp light transmission region 28 via the steps 30 and is emitted to the front side as diffused light.

The entire region excluding the clearance lamp light transmission region 28 of the extension 10 is formed as a decorated region 34 in which a decoration pattern 32 is formed by crossing a plurality of thin lines in a lattice pattern. However, the formation position of the decorated region 34 is not particularly limited, and the decorated region 34 may be formed at least in a part of the region excluding the clearance lamp light transmission region 28 of the extension 10.

Figure 3A:
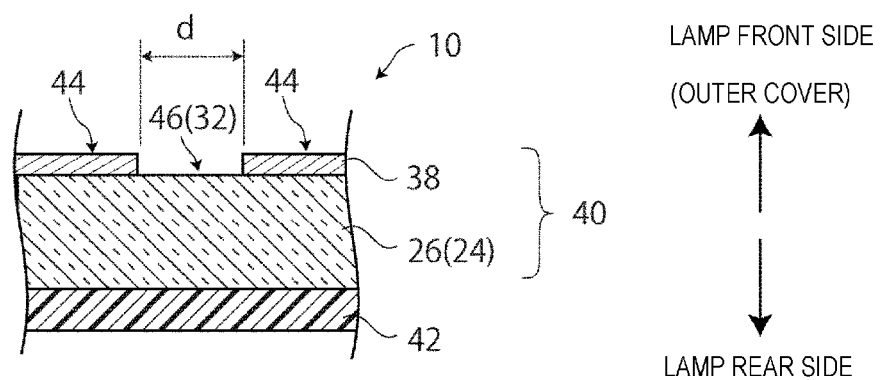
FIG. 3A is an enlarged cross-sectional view of a decorated region according to the embodiment.

FIG. 3A is an enlarged cross-sectional view of the extension 10 in the decorated region 34. In enlarged cross-sectional views in each embodiment illustrated below, ratio of thicknesses of the respective layers illustrated does not reflect the actual ratio, but schematically illustrate the configuration.

A metal evaporation film 38 is laminated on a surface side of a transparent resin layer 26 that constitutes the transparent resin substrate 24, that is, a surface side facing the outer cover 14. For example, aluminum, tin, and stainless may be used as metal that forms the metal evaporation film 38.

On the surface of the transparent resin layer 26 side of a laminated body 40 of the transparent resin layer 26 and the metal evaporation film 38, a colored layer 42 made of an acrylic urethane resin paint containing a black pigment (e.g., a black azo pigment) as a pigment is formed. The paint containing the black pigment transmits infrared rays, particularly near-infrared rays having a wavelength of 800 to 1,400 nm with a spectral transmittance of 50% or more. A spectral transmittance at a wavelength of 1,064 nm which is a YAG laser wavelength is 68.5%.

Paints that form the colored layer 42 are not limited to the above, as long as the paints use a pigment that transmits infrared rays. Examples thereof include acrylic resin-based paints such as acrylic urethane, acrylic silicone, and acrylic lacquer, epoxy resin type paints, and resin-based paints such as polyphenyl resin, polystyrene resin, and polypropylene resin, using pigments such as azo red (red), phthalocyanine blue (blue), and azo yellow. Such paints may have a spectral transmittance of 50% or more with respect to laser beam of infrared rays used for laser irradiation.

The laminated body 40 includes an evaporation film formed region 44 on which the metal evaporation film 38 is formed, and an evaporation film non-formed region 46 that is formed by removing the metal evaporation film 38 by infrared laser beam. In the present embodiment, the evaporation film non-formed region 46 has a decoration pattern 32 in which a plurality of thin lines are crossed in a lattice shape. From the view point of visibility, the width d of the decoration pattern 32 may be 0.1 mm or more.

Next, a manufacturing method of the extension 10 will be described. First, for example, a transparent resin such as polycarbonate is injection-molded into a predetermined extension shape. The thickness of the transparent region substrate 24 molded in this way is, for example, about several mm.

Next, the transparent resin substrate 24 is transferred into a vacuum chamber by masking the clearance lamp light transmission region 28, and aluminum is evaporated on a surface side of the transparent resin substrate 24 by, for example, resistance heating evaporation method so as to perform forming of the metal evaporation film 38. The thickness of the metal evaporation film 38 is, for example, about 20 to 150 nm.

Next, the laminated body 40 in which the metal evaporation film 38 is formed on the transparent resin substrate 24 is taken out from the vacuum chamber and a paint is applied on a surface of the transparent resin layer 26 side by air spray so as to form the colored layer 42. The thickness of the colored layer 42 is, for example, about 5 to 10 μm.

Finally, infrared laser beam is irradiated from the surface of the metal evaporation film 38 side. When the laser beam is irradiated, the metal evaporation film 38 in the irradiated portion absorbs the laser beam and is overheated so as to be separated or evaporated. Therefore, the evaporation film non-formed region 46 is formed. At this time, the laser beam is also irradiated to the colored layer 42 via the transparent resin layer 26. However, since the colored layer 42 transmits the laser beam, deformation does not occur.

Examples of the infrared laser used for irradiating the laser beam include, for example, a $CO_2$ laser, a ruby laser, a semiconductor laser, a YAG laser, a $YVO_4$ laser. Since these infrared laser devices emit infrared laser beam, the colored layer 42 transmits the laser beam with a sufficient transmittance. Further, by using these infrared laser devices, the decoration pattern 32 may be formed in any shape, for example, a dot, a character, a mark, and a more complex pattern without being limited to a straight line illustrated in the drawing.

Among the mentioned infrared laser devices, the YAG laser and the $YVO_4$ laser may be used. Because both of the YAG laser and the $YVO_4$ laser have a high absorptivity to metal, finishing becomes aesthetic. It is possible to interchange the order of forming of the colored layer 42 and forming of the evaporation film non-formed region 46 by irradiation of the laser beam.

Figure 3B:
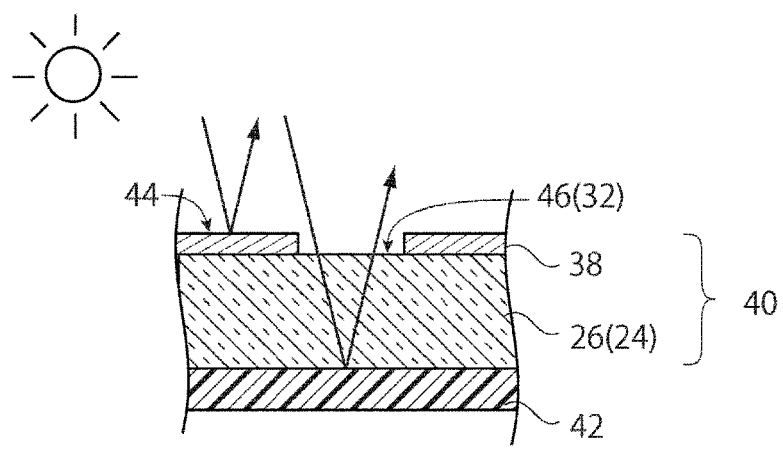
FIG. 3B is a view for explaining an action of the decorated region.

Next, an action of the decorated region 34 of the extension 10 will be described. As illustrated in FIG. 3B, when light from the outside of the lamp, for example, natural light such as sunlight during the daytime is incident to the evaporation film formed region 44, the light is reflected by the metal evaporation film 38, so that the evaporation film formed region 44 is observed as a metal-tone (silver color) evaporation surface. Meanwhile, when the light is incident to the evaporation film non-formed region 46, the light is incident to the colored layer 42 via the transparent resin layer 26 and the reflected light is observed. Therefore, the evaporation film non-formed region 46 is observed as a color (black color) of the pigment contained in the colored layer 42.

Therefore, as illustrated in FIG. 1, the decoration pattern 32 is recognized as a sharp black color line pattern in the metal-tone (silver color) evaporation surface.

As described above, the color of the pigment used in the colored layer 42 is not limited to black color, but pigments of various colors may be used. Using a black color paint is advantageous because strong contrast between the color-tone of the metal-tone of the evaporation film formed region 44 and the color-tone of the colored layer observed from the evaporation film non-formed region 46 may be obtained.

In this manner, when observing the extension 10 from the front side, the metal evaporation film 38 exhibits the color-tone (silver color in the present embodiment) of the metal-tone, and the evaporation film non-formed region 46 exhibits the color-tone (black color in the present embodiment) of the paint contained in the colored layer. For this reason, the aesthetic appearance of the pattern is enhanced due to contrast between the color-tone of the metal-tone and the color-tone of the colored layer.

Further, since the colored layer 42 transmits the laser beam when removing the metal evaporation film 38 by the laser beam, the temperature rise in the colored layer is reduced, so that deformation, in which, for example, the colored layer is also removed together with the metal evaporation film 38, the colored layer 42 is discolored, or the transparent resin substrate 24 is deformed is suppressed.

The metal evaporation film 38 may be a mirror evaporation film that totally reflects the incident light or a half mirror evaporation film that reflects a part of the incident light and transmits a part thereof. When the metal evaporation film is a mirror evaporation film, the incident light is totally reflected, and thus the evaporation surface is observed as a color-tone of the metal-tone that is shining.

In the case where the metal evaporation film 38 is a half mirror evaporation film, when the light that is incident to the extension 10 is reflected, the color-tone of the metal-tone of the evaporation film formed region 44 is observed as a color-tone of the metal-tone having a color-tone of the colored layer 42, due to the influence of the color of the paint contained in the colored layer 42. Therefore, it is possible to give an impression with quality.

Second Embodiment

In a second embodiment, a resin molded product according to the present disclosure is embodied as an inner lens 210 used as a component of a vehicle lamp 201. The vehicle lamp 201 illustrated in FIG. 4 is a side turn signal lamp assembled to a door mirror 2 on the left side as viewed from the front side of a vehicle.

Figure 4:
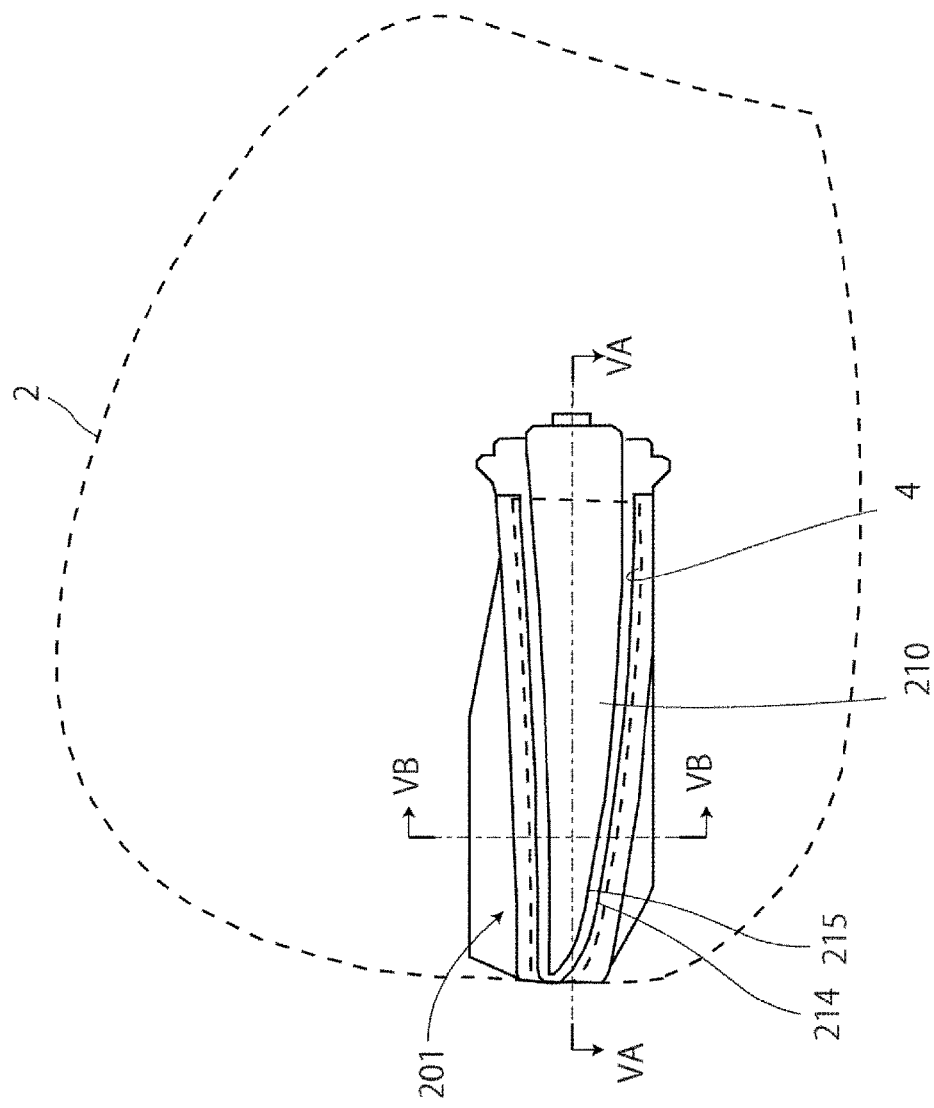
FIG. 4 is a front view of a vehicle lamp according to another embodiment of the present disclosure.
Figure 5A:
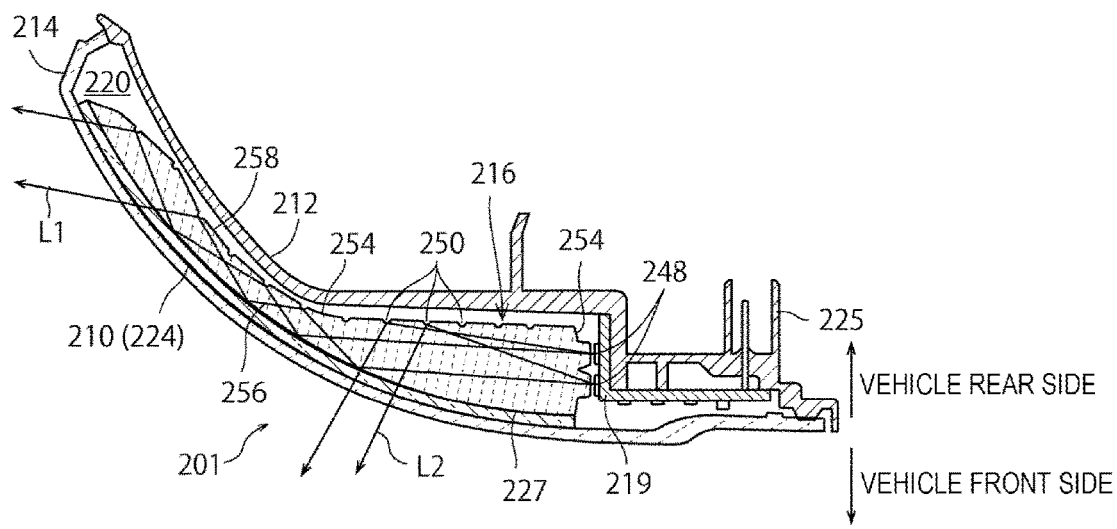
FIGS. 5A and 5B are cross-sectional views of a vehicle lamp according to the embodiment.
Figure 5B:
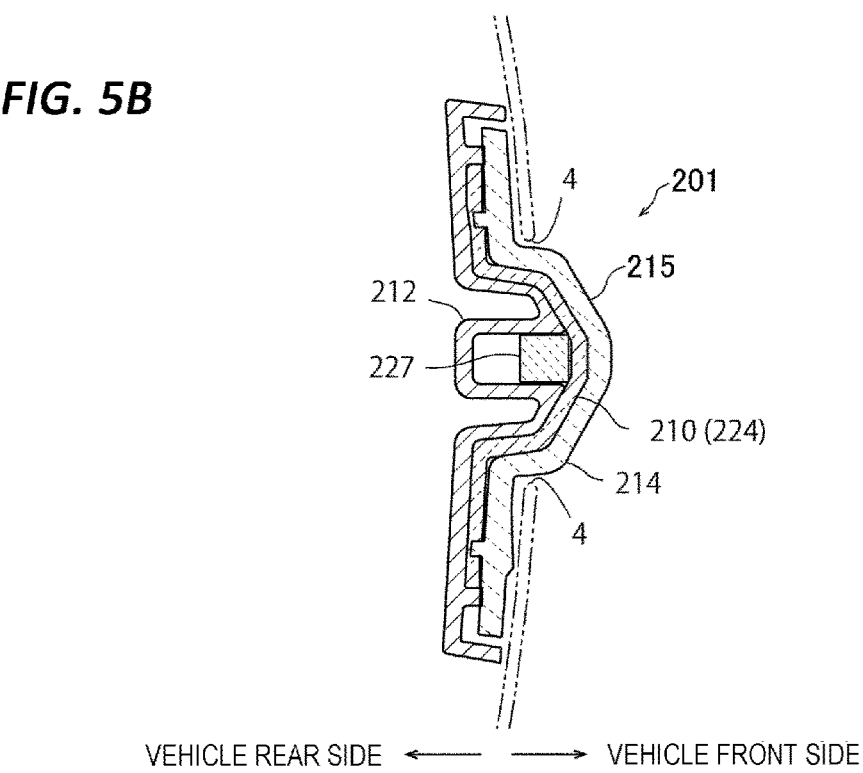

As illustrated in FIGS. 4, 5A, and 5B, the vehicle lamp 201 includes a lamp body 212, an outer cover 214, a lamp unit 216, and the inner lens 210.

The lamp body 212 is assembled inside the door mirror 2, has a curved elongated shape, and is opened toward the front surface. The outer cover 214 is made of a transparent resin and covers the opening on the front surface of the lamp body 212, and a lamp chamber 220 is defined by the lamp body 212 and the outer cover 214.

Further, the outer cover 214 is configured such that a window portion 215 is exposed from an opening 4 provided in the door mirror 2.

The lamp unit 216 includes a light source board 219, a socket 225, and a light guide lens 227. The light source board 219 and the socket 225 are provided at the vehicle body side end portion of the lamp body 212. The light source board 219 is provided with LED light sources 248.

The light guide lens 227 is a light guide body made of a transparent resin material such as a polycarbonate resin or an acrylic resin, and is elongated molded so as to conform to the lamp body 212 and the outer cover 214. Further, on a surface of the light guide lens 227 facing the outer cover 214, a plurality of reflective steps 250 are formed at a predetermined interval over the entire length in the longitudinal direction. The reflective steps 250 may have any known shape, for example, a stipple shape.

The inner lens 210 is a transparent resin substrate 224 which is a resin molded product obtained by molding a transparent resin such as a polycarbonate resin, or an acrylic resin such as a polymethyl methacrylate resin in a predetermined shape. Further, the inner lens 210 has a shape that conforms to the back surface of the outer cover 214, and is arranged between the outer cover 214 and the light guide lens 227. Further, the inner lens 210 is configured to be visible from the outside through the window portion 215 of the outer cover 214.

A metal evaporation film 238 that is made of the material similar to the metal evaporation film 38 according to the first embodiment is formed on a surface side of a transparent resin layer 226 that constitutes the transparent resin substrate 224, that is, a surface side facing the outer cover 214. The metal evaporation film 238 is a half mirror evaporation film and may have thickness of 20 to 80 nm. When the thickness of the metal evaporation film 238 is 20 nm or less, the function of reflecting the incident light becomes weak, and when the thickness thereof is 80 nm or more, the function of transmitting the incident light becomes weak. Thus, it is impossible to function as a half mirror that transmits a part of the incident light and reflects a part thereof.

On the surface of the transparent resin layer 226 side of a laminated body 240 of the transparent resin layer 226 and the metal evaporation film 238, a colored layer 242 is formed by a paint containing a pigment (a yellow transparent pigment) that transmits infrared rays. The paint used for the colored layer 242 may be a colored transparent paint or a black transparent paint among paints using a pigment that transmits infrared rays, similar to the first embodiment. In the present specification, the term "black transparent" refers to a blackish color that exhibits visible light transparency such as gray smoke.

The laminated body 240 includes an evaporation film formed region 244 in which the metal evaporation film 238 is formed, and an evaporation film non-formed region 246 that is formed by removing the metal evaporation film 238 by irradiation with infrared laser beam. In the present embodiment, the evaporation film non-formed region 246 forms a pattern that designs a character string as illustrated as a decoration pattern 232 in FIGS. 8A and 8B.

Since the manufacturing method of the inner lens 210 is the same as that of the extension 10, duplicate explanation will be omitted.

Next, an action of the inner lens 210 when the LED light sources 248 are turned OFF and turned ON will be described.

Figure 6A:
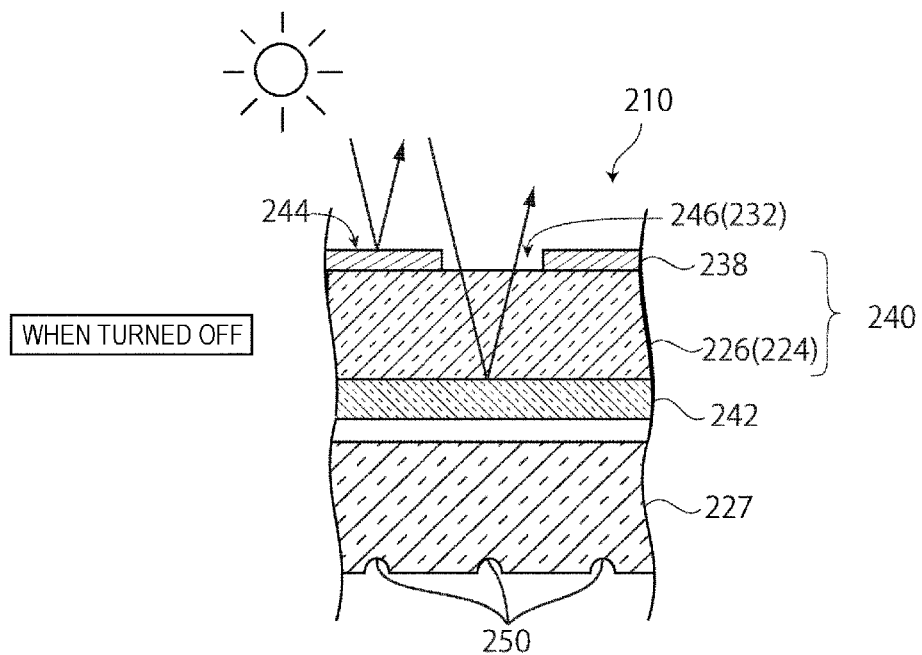
FIGS. 6A and 6B are enlarged cross-sectional views of an inner lens according to the embodiment.
Figure 7A:
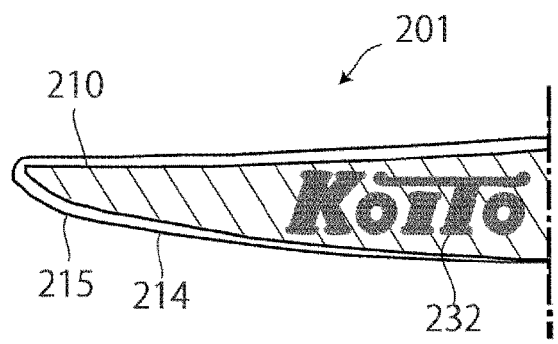
FIGS. 7A and 7B are views illustrating the appearance of the inner lens according to the embodiment.

When the LED light sources 248 are turned OFF, as illustrated in FIG. 6A, when light from the outside of the lamp unit is incident to the evaporation film formed region 244, the light reflected from the metal evaporation film 238 among the incident light is observed, so that the evaporation film formed region 244 is observed as the metal-tone evaporation surface. Meanwhile, when the light is incident to the evaporation film non-formed region 246, the light reflected from the colored layer 242 through the transparent resin layer 226 is observed. Therefore, the evaporation film non-formed region 246 is observed as a color (yellow color) of the pigment contained in the colored layer 242. Therefore, when observing the inner lens 210 from the front side of the vehicle lamp 201, as illustrated in FIG. 7A, the decoration pattern 232 is observed as a pattern due to contrast between a color-tone (silver color) of the metal-tone evaporation surface indicated by hatching and a yellow color-tone of the colored layer 242.

Meanwhile, when the LED light sources 248 are turned ON, as illustrated in FIG. 5A, a part of the emitted light from the LED light sources 238 is incident from an incident portion 254 on the front side of the vehicle, is repeatedly reflected by inner surfaces between an inner surface 256 on the front side of the light guide lens 227 and an inner surface 258 of the rear side of the light guide lens 227, and is emitted as illumination light L1 from the end portion of the vehicle rear side.

The remaining portion of the emitted light from the LED light sources 248 is reflected from the reflecting steps 250 formed on the inner surface 258 of the rear side of the light guide lens 227 and is incident to the inner lens 210 as reflected light L2. FIG. 5A illustrates a state in which the reflected light L2 progresses by way of the action at the two reflecting steps 250 as a representative. However, actually, the same action is exhibited in all the reflecting steps 250, and the reflected light L2 is emitted from the entire front surface of the light guide lens 227 to the rear side of the vehicle. Therefore, the light guide lens 227 acts as a surface light emitting light source that causes the entire front surface to emit light uniformly.

Figure 6B:
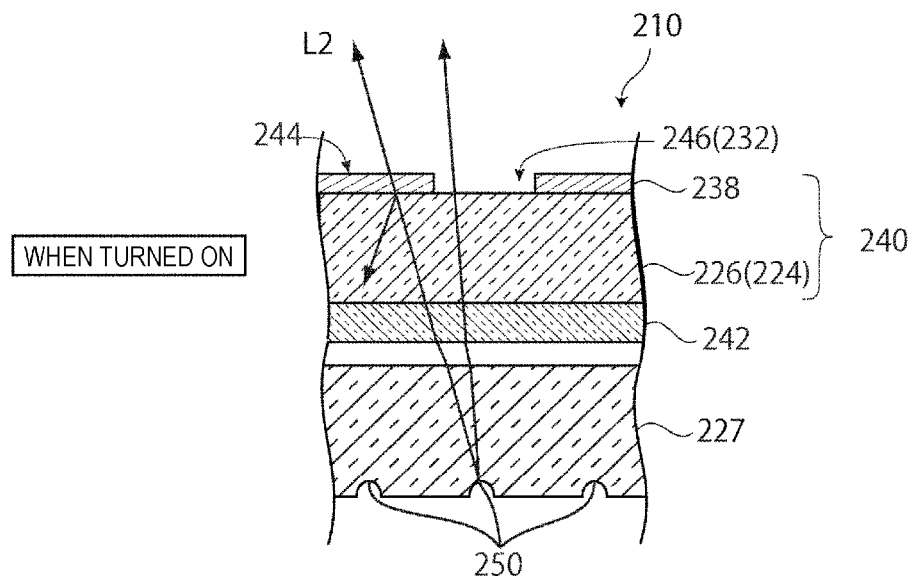

The light that is incident to the inner lens 210, as illustrated in FIG. 6B, is incident to the transparent resin layer 226 via the colored layer 242 and progresses in the transparent resin layer 226. When the light is incident to the evaporation film formed region 244, a part of the light is reflected from the metal evaporation film 238, but the remaining portion of the light is transmitted through the metal evaporation film 238, and then is emitted to the front side of the vehicle lamp as slightly dark light colored with a color (yellow color) of the paint in the colored layer 242. Meanwhile, when the light is incident to the evaporation film non-formed region 246, the light is emitted to the front side of the vehicle lamp as bright light colored with the color (yellow color) of the paint in the colored layer 242.

Figure 7B:
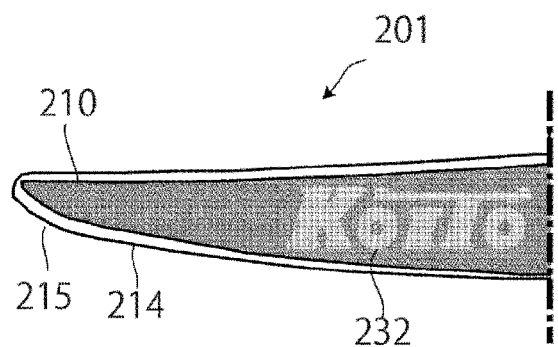

Therefore, when observing the inner lens 210 from the front side of the vehicle lamp 201, as illustrated in FIG. 7B, the decoration pattern 232 that appears from light slightly dark and having a color (yellow color) of the pigment contained in the colored layer and has a color (yellow color) of the pigment shining brightly is observed. Further, since the light guide lens 227 acts as a surface light emitting light source as described above, the decoration pattern 232 of the color of the pigment emits light uniformly.

As described above, when using the inner lens 210 according to the present embodiment, while being turned OFF, aesthetic appearance of the pattern is enhanced due to contrast between the color-tone of the metal-tone and the color-tone of the colored layer, and it is possible to provide a vehicle lamp that has different aesthetic appearance between turned OFF and turned ON.

Third Embodiment

Also in a third embodiment, a resin molded product according to the present disclosure is embodied as an inner lens 310 used as a component of a vehicle lamp 301. The vehicle lamp 301 is a side turn signal lamp that has substantially the same configuration as that of the vehicle lamp 201 according to the second embodiment except for a lamination order of a metal evaporation film 338 and a colored layer 342 laminated on a transparent resin substrate 324.

Figure 8A:
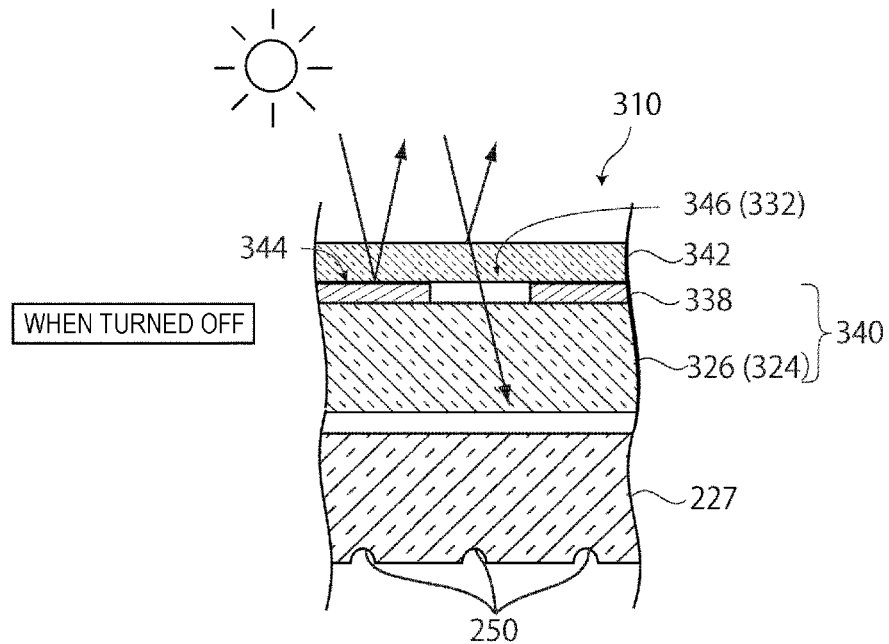
FIGS. 8A and 8B are enlarged cross-sectional views of an inner lens of the vehicle lamp according to another embodiment.
Figure 8B:
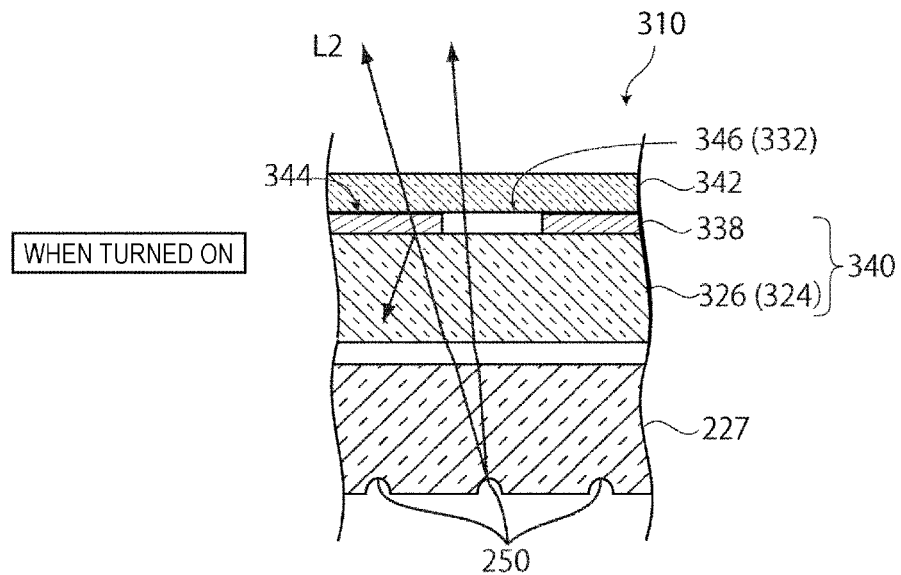

That is, as illustrated in FIG. 8A, in the inner lens 310, as in the second embodiment, the metal evaporation film 338 is formed on a surface side of a transparent resin layer 326 that constitutes the transparent resin substrate 324. However, the colored layer 342 is formed on the metal evaporation film 338 side of a laminated body 340 of the transparent resin substrate 324 and the metal evaporation film 338, that is, on the metal evaporation film 338.

The metal evaporation film 338 is a half mirror evaporation film made of the same material as that of the metal evaporation film 38 according to the first embodiment, and the thickness thereof is 20 to 80 nm. The paint used for the colored layer 342 may be a colored transparent paint or a black transparent paint among paints using a pigment that transmits infrared rays, similar to the first embodiment. In the present embodiment, a yellow transparent pigment is used. Further, the thickness of the colored layer 342 is, for example, about 5 to 10 μm.

The laminated body 340 includes an evaporation film formed region 344 on which the metal evaporation film 338 is formed, and an evaporation film non-formed region 346 that is formed by removing the metal evaporation film 338 by irradiation with infrared laser beam. In the present embodiment, the evaporation film non-formed region 346 forms a pattern that designs a character string as illustrated as a decoration pattern 332 in FIGS. 9A and 9B.

Next, a manufacturing method of the inner lens 310 will be described. First, for example, a transparent resin such as polycarbonate is injection-molded to mold in a predetermined inner lens shape. The thickness of the transparent region substrate 324 molded in this way is, for example, about several millimeters.

Next, the transparent resin substrate 324 is transferred into a vacuum chamber, and metal such as aluminum is evaporated on a surface side of the transparent resin substrate 324 by, for example, resistance heating evaporation method so as to perform forming of the metal evaporation film 338.

Next, the laminated body 340 in which the metal evaporation film 338 is formed on the transparent resin substrate 324 is taken out from the vacuum chamber and a paint is applied on a surface of the metal evaporation film 338 side by, for example, air spray so as to form the colored layer 342.

Finally, as in the first embodiment, infrared laser beam is irradiated from the surface of the colored layer 342 side by using an infrared laser. When the laser beam is irradiated, the laser beam is transmitted through the colored layer 342, and the metal evaporation film 338 absorbs the laser beam and is overheated so as to be separated or evaporated. Therefore, the evaporation film non-formed region 346 is formed.

When the laser beam is not irradiated from the colored layer 342 side but from the transparent resin layer 326 side, the evaporation film non-formed region 346 may be also formed.

Next, descriptions will be made on an action of the inner lens 310 when the LED light sources 248 are turned OFF and turned ON.

When the LED light sources 248 are turned OFF, as illustrated in FIG. 8A, when light from the outside of the lamp unit is incident to the evaporation film formed region 344 through the colored layer 342, the light reflected from the metal evaporation film 338 among the incident light is observed, so that the evaporation film formed region 344 is observed as the metal-tone evaporation surface having a color (yellow color) of the pigment contained in the colored layer 342. Meanwhile, when the light is incident to the evaporation film non-formed region 346, the light transmitted through the transparent resin layer 326 and reflected from the colored layer 342 is observed. Therefore, the evaporation film non-formed region 346 is recognized as a color (yellow color) of the pigment contained in the colored layer 342.

Figure 9A:
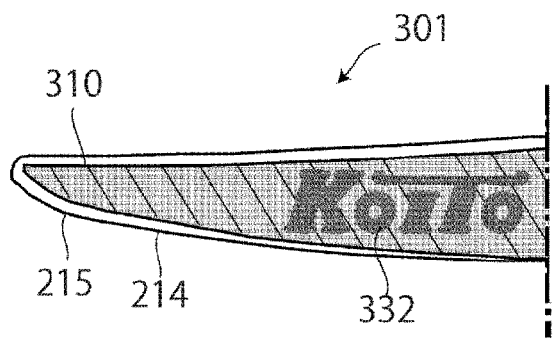
FIGS. 9A and 9B are views illustrating the appearance of the inner lens according to the embodiment.

Therefore, when observing the inner lens 310 from the front side of the vehicle lamp 301, as illustrated in FIG. 9A, the decoration pattern 332 is observed as a pattern due to contrast between a color-tone (silver color) of the metal-tone evaporation surface indicated by hatching and having a color (yellow color) of the pigment contained in the colored layer 342, and a yellow color-tone of the colored layer 342.

Meanwhile, when the LED light sources 248 are turned ON, in the evaporation film formed region 344, a part of the light emitted from the light guide lens 227 and transmitted through the transparent resin layer 326 is reflected from the metal evaporation film 338, but the remaining portion of the light is transmitted through the metal evaporation film 338 and the colored layer 342, and then is emitted as dark light having a color (yellow color) of the pigment contained in the colored layer 342. Meanwhile, in the evaporation film non-formed region 346, the light emitted from the light guide lens 227 and transmitted through the transparent resin layer 326 is emitted as bright light having a color (yellow color) of the pigment contained in the colored layer 342.

Figure 9B:
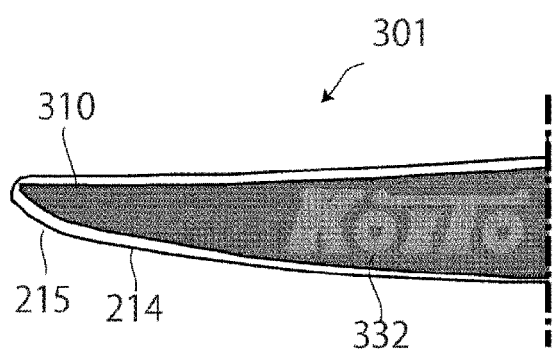

Therefore, when observing the inner lens 310 from the front side of the vehicle lamp 301, as illustrated in FIG. 9B, the decoration pattern 332 that appears from light slightly dark and having a color (yellow color) of the pigment contained in the colored layer and has a color (yellow color) of the pigment shining brightly is observed.

As described above, according to the vehicle lamp 301 of the present embodiment, when turned OFF the light source, enhanced aesthetic appearance, different from the vehicle lamp 201 according to the second embodiment, may be obtained due to contrast between the color-tone of the colored metal-tone and the color-tone of the colored layer. Further, according to the vehicle lamp 301 of the present embodiment, it is possible to provide a vehicle lamp that has different aesthetic appearance when a light source is turned OFF and turned ON.

Further, in the above embodiments, descriptions have been made on the extension 10 provided in a right side headlamp and the inner lenses 210 and 310 provided in a side turn signal lamp, but the present disclosure is not limited thereto. The present disclosure may be applied to a resin product including vehicle lamp components such as an extension, an inner lens, an outer cover and a projection lens provided in various vehicle lamps, and vehicle components such as a rear window and various panels.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:
1. A resin molded product comprising:
   a laminated body including a colorless and transparent resin layer that constitutes a colorless and transparent resin substrate molded in a predetermined shape, and a metal evaporation film formed on a first surface of the colorless and transparent resin layer;
   a colored layer continuously formed on one entire surface of the laminated body and configured to transmit infrared rays; and a light guide lens made of a transparent resin material and continuously formed on one entire surface of the colored layer, wherein the laminated body includes a region where the metal evaporation film is removed by an irradiation with an infrared laser beam, the colored layer is formed on a second surface of the colorless and transparent resin layer opposite to the first surface of the colorless and transparent resin layer on which the metal evaporation film is formed, the metal evaporation film is in direct contact with the colorless and transparent resin layer, the colored layer is in direct contact with the colorless and transparent resin layer, and the light guide lens is in direct contact with the colored layer, the colored layer is made of an acrylic urethane resin paint including a black pigment, and a plurality of reflective steps is formed at a predetermined interval on a fourth surface of the light guide lens opposite to a third surface of the light guide lens on which the colored layer is formed.

2. A vehicle part comprising the resin molded product according to claim 1.

3. The resin molded product according to claim 1, wherein the colored layer has a spectral transmittance of 50% or more with respect to the infrared laser beam.

4. The resin molded product according to claim 1, wherein a width of the region is 0.1 mm or more.

5. The resin molded product according to claim 1, wherein a thickness of the metal evaporation film is about 20 nm to 150 nm.

6. The resin molded product according to claim 1, wherein a thickness of the colored layer is about 5 μm to 10 μm.

* * * * *